Oct. 21, 1958  E. A. GIMALOUSKI  2,856,665
FASTENER FOR USE ON PARACHUTE HARNESSES
Filed Jan. 3, 1955
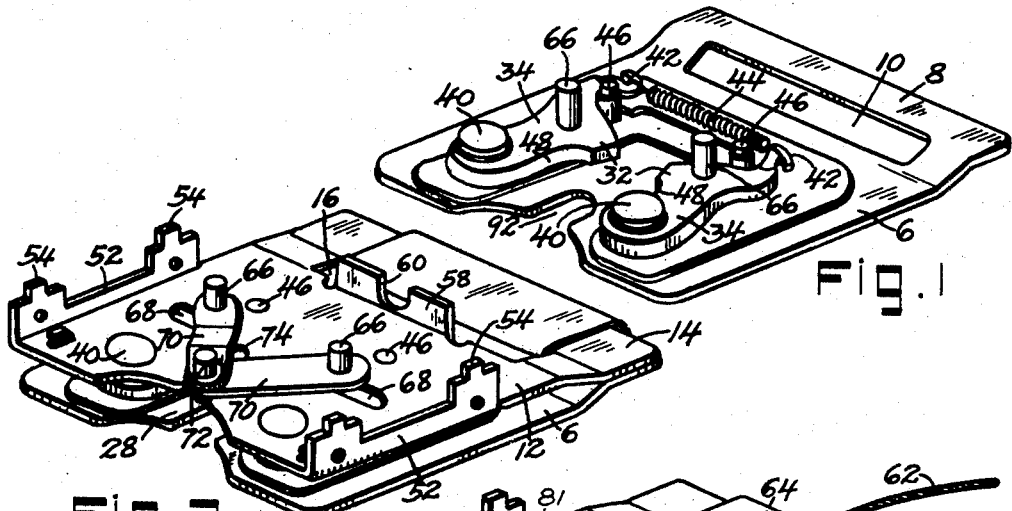
Fig. 1.
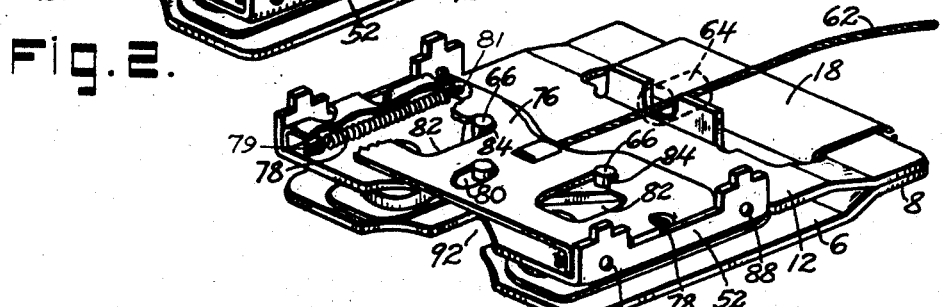
Fig. 2.
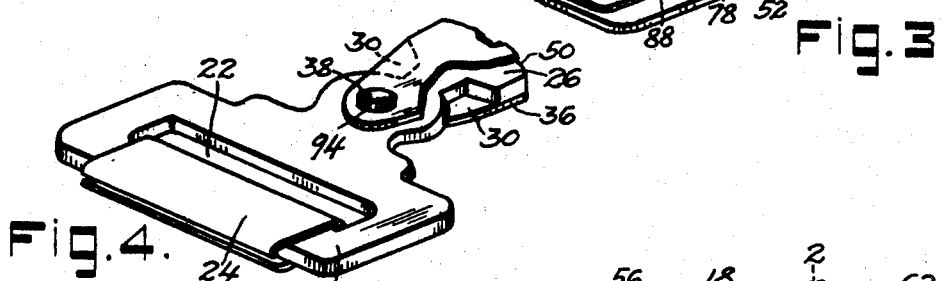
Fig. 3.
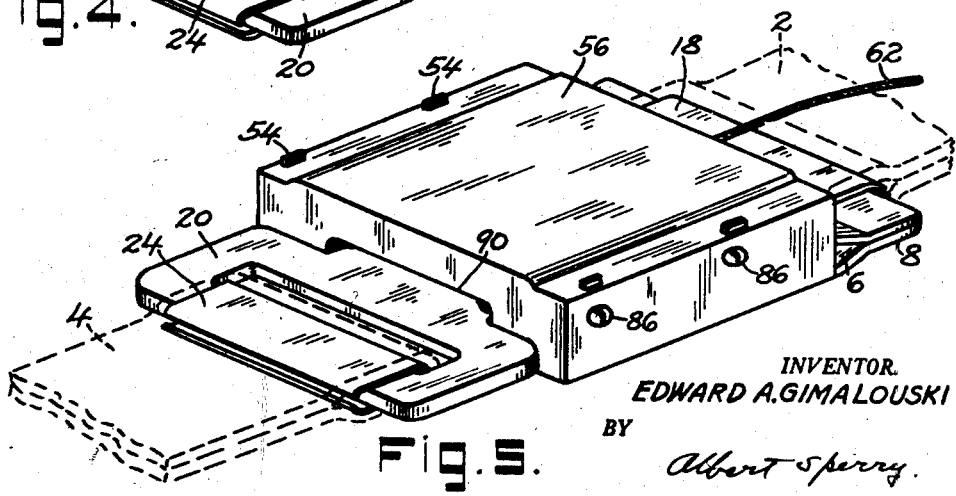
Fig. 4.
Fig. 5.
INVENTOR.
EDWARD A. GIMALOUSKI
BY
Albert Sperry.
ATTORNEY.

2,856,665

FASTENER FOR USE ON PARACHUTE HARNESSES

Edward A. Gimalouski, Manchester, Conn., assignor, by mesne assignments, to Pioneer Parachute Company, Inc., Manchester, Conn., a corporation of Delaware Application January 3, 1955, Serial No. 479,566

5 Claims. (Cl. 24—211)

This invention relates to fasteners for securing straps, webbing or belts together and as hereinafter shown and described is directed particularly to fasteners for use on parachute harnesses, although the invention may be used in various other applications and combinations as, for example, for securing straps or webbing to aircraft or other structures in a cargo harness and for other relations.

It is of the utmost importance that the straps of a parachute harness be secured together in a manner to preclude accidental release before or during a parachute descent and yet the straps should be capable of easy and quick release after landing. For safety purposes most approved parachute harness fasteners are designed for operation in response to two different actuating movements so that accidental release cannot occur. The fasteners employed for connecting such straps also must be strong and rugged in construction but they should be relatively light in weight and capable of operation under adverse conditions, as when ground into dirt or immersed in water.

In some parachute harnesses a number of fasteners are located at different points on the harness and actuated by a single operating mechanism, through cables or other connections as exemplified by my copending application Serial No. 353,844, filed May 8, 1953, now Patent Number 2,726,832. In such constructions, the actuating cables must be sufficiently loose or slack to allow for movements of the wearer yet the fasteners must be actuated simultaneously or in a predetermined manner.

In accordance with the present invention, a novel type of fastener device is provided which may be used to releasably secure the ends or portions of straps together and particularly adapted for use on parachute harnesses, including those harnesses wherein several spaced connections are released simultaneously or in a predetermined manner. The construction is light, strong and relatively simple and may be actuated by operating means movable in two different directions or in two successive steps to prevent accidental release of the straps.

The advantages of the present invention are preferably attained by providing a fastener with latching elements movable into position to positively secure a lug or terminal member in place for connecting one strap to another. The arrangement permits an initial movement of the parts to take place whereby slack or lost motion is taken up in the system although the latching elements are actuated in a controlled manner in response to movement of a two position operating device. The various parts of the fastener may be largely formed of sheet metal stampings or other light-weight material and the assembly may therefore be produced economically while being strong, durable and certain in operation.

One of the objects of the invention is to provide a fastener for straps or the like which is simple and positive in operation and yet light in weight and durable in construction.

Another object of the invention is to provide fasteners for use on parachute harnesses which are capable of operation in a controlled manner by a two position operating device.

A particular object of the invention is to provide a fastener which is capable of an initial movement to condition the fastener for release and to disengage safety elements as when allowing slack to be taken up in an actuating cable before actual releasing movement of the fastener takes place.

These and other objects and features of the present invention will appear from the following description thereof in which reference is made to the accompanying drawing.

In the drawing:

Fig. 1 is a perspective view illustrating the lower member of a typical form of fastener embodying the present invention;

Fig. 2 is a perspective view illustrating the assembly of Fig. 1 with a positioning plate attached thereto;

Fig. 3 illustrates the assembly of Fig. 2 with an actuating member overlying the positioning plate;

Fig. 4 illustrates a typical lug or terminal member for a strap adapted for use with the fastener of Figs. 1, 2 and 3; and Fig. 5 is a perspective view of a completed fastener assembly embodying the present invention with straps connected thereto.

In that form of the invention chosen for the purpose of illustration in the drawing, the fastener is designed to releasably secure a strap 2 to a strap 4. The base 6 of the fastener is shown in Fig. 1 and has a portion 8 which preferably is offset from the base and provided with an opening 10 through which the strap 2 is passed. A positioning plate 12 is held in spaced relation with respect to the base 6 and is provided with an offset portion 14 which is provided with a strap receiving opening 16 which cooperates with the opening 10 to provide a slot through which the strap 2 extends. A guard 18 preferably extends about the offset portions 8 and 14 of the base and positioning plate respectively so as to provide a smooth, rounded surface for engagement by the strap 2.

The strap 4 is provided with a terminal element 20 having a slot 22 therein and a guard 24 extending about the extremity of the terminal member 20 to provide a smooth surface for engagement by the strap 4. The opposite end of the terminal member is provided with an attaching lug 26 adapted to enter the space 28 between the base 6 and the positioning plate 12. The terminal member 20 may be formed of a stamped metal piece with recesses 30 in opposite sides of the lug 26 for receiving the locking portions 32 of the latching elements 34 mounted on the base 6. A strap 36 extends over the end of the locking lug 26 and is secured in place by the pin 38 so as to enclose the upper and lower sides of the recesses 30 and prevent displacement of the locking portions 32 of the latching elements from the locking lug 26 when the latter is in retaining engagement with the latching elements. Strap 36 further serves to prevent the lug 26 from catching upon the harness webbing or elsewhere during release of the harness.

As shown in Fig. 1 the latching elements 34 are pivotally mounted for movement about the pins 40 mounted on the base 6 of the assembly. The opposite or free ends of the latching elements 34 are provided with hook shaped extremities 42 to which a spring 44 is connected for urging the latching elements toward each other so that the locking portions 32 of the latching elements will normally be urged into retaining engagement with the recesses 30 on the locking lug 36 of the terminal element 20. Moreover, the individual terminal members may be of various fasteners in a harness and may thus be inserted into place past the spring pressed latching elements before they are locked in place by the entry of operating pins 66 into the locking extensions 84 as described below. Stop pins 46 are positioned to limit inward movement of the latching elements toward each other under the action of the spring 44. The surfaces 48 of the latching elements adjacent the locking portions 32 are preferably rounded or cam shaped and engageable with the outer rounded edge 50 of the locking lug 26 so that when the locking lug is inserted into the opening 28 between the base 6 and the positioning plate 12, the latching elements will be urged outwardly against the action of the spring 44 until the locking lug has been inserted far enough to enable the locking portions 32 of the latching elements to enter the recesses 30 on opposite sides of the locking lug 26 of the terminal element 20. The locking portions 32 then snap into the recesses 30 and serve to hold the locking lug and terminal element 20 in positive engagement with the fastener.

The positioning plate 12 which is spaced from the base 6 is formed with openings into which the upper ends of the stop pins 46 extend. In this way, the positioning plate 12 is held fixedly in place. The opposite sides of the positioning plate are turned upward as shown at 52 and are provided with lugs 54 which serve to position the cover 56 of the fastener when the parts are in assembled relation. Lugs 54 may be peened over if desired to hold the cover 56 in place on the assembly. The edge of the positioning plate 12 adjacent the strap receiving opening 16 is turned inward and upward as shown at 58 and provided with a recess 60 through which an actuating cable 62 may pass. A sleeve 64 is located in the recess 60 for guiding the actuating cable 62 as it moves with respect to the end member 58 of the positioning plate 12. The latching elements 34 carried by the base 6 are provided with upwardly extending operating pins 66 which extend through slots 68 in the positioning plate 12. Links 70 are connected to the operating pins 66 and to an actuating pin 72. The lower end of the actuating pin 72 extends into and is guided by a slot 74 in the positioning plate 12.

An actuating member 76 which is preferably in the form of a plate or slide overlies the base plate 12 and is connected to the actuating cable 62. Springs 78 normally urge the actuating member or slide 76 to the left as seen in Fig. 3. For this purpose one end of each spring 78 is connected to a lug 79 struck up from plate 12, whereas the opposite end of each of the springs 78 is connected to a downwardly turned flange 81 on the inner edge of the slide 76. The upper end of the actuating pin 72 extends into the slot 80 whereas the upper ends of the operating pins 66 extend into the openings 82 in the actuating member or slide 76. The openings 82 are provided with extensions 84 which are arranged to receive the upper ends of the pins 66 and act as safety means in that they positively prevent lateral movement of pins 66 or releasing movement of the latching elements when the actuating member 76 is in the position shown in Fig. 3. However, upon movement of the actuating member or slide 76 to the right as seen in Fig. 3, the safety means are withdrawn from the operating pins 66 so that they are free to move laterally and outward within the openings 82.

The cover 56 for the assembly extends over the elements shown in Fig. 3 and is positioned by the lugs 54 on the opposite side portions 52 of the positioning plate 12. The cover is secured in place by screws 86 which pass through openings in the cover and into threaded openings 88 in the side portions 52. The end of the cover adjacent the opening 28 is cut out to provide an opening 90 to receive the locking lug 26 whereas the opposite end of the cover extends downward about the sleeve 64 to close the assembly.

In order to prevent engagement of the straps by which the fastener is carried, while in a twisted condition, the base 6 of the fastener body may, if desired, be provided with a notch or recess 92 and the pin 38 may be arranged to project beyond one face of the lug 26 on terminal member 20 as shown at 94 in Fig. 4. When so constructed lug 26 can only be inserted when inverted from the position of Fig. 4 to allow the projection 94 to enter recess 92 in the body of the fastener. Assembly of the parts when the terminal member is twisted through 180° is thereby prevented.

The fastener of the present invention may be used in substantially any type of parachute harness or elsewhere and when employed in a harness of the type shown and described in said application Serial No. 353,844, the fasteners may be positioned to connect the shoulder straps and one or more of the leg straps to the main sling of the harness. Further, the fasteners may be actuated by a two position operating device located adjacent one of the fasteners or at any other convenient point on the harness. The operating device when moved is designed to pull the actuating cable 62 to effect release of the straps of the harness connected by the fastener of the present invention.

In connecting the straps 2 and 4 the operating device is moved to take up slack in the actuating cable 62 and to move the actuating member or slide 76 against the action of the springs 78 a distance sufficient to allow the operating pins 66 to move outward in the openings 82 and along the slots 68. The locking lug 26 is then inserted through the opening 90 in the cover 56 and into the opening 28 between the base 6 and the positioning plate 12. As the locking lug 26 is moved into place, the rounded end 50 engages the cam surfaces 48 on the inner sides of the latching elements 34 so as to force these elements apart against the action of the spring 44. When the locking lug has been fully inserted the recesses 30 are moved into position opposite the locking portions 32 of the latching elements whereupon the locking portions will snap into the recesses 30 under the action of the spring 44 and thereby retain the locking lug positively in engagement with the fastener. Thereafter, the actuating cable 62 is released whereby the slide 76 is moved to the left as seen in Fig. 3 so that the operating pins 66 will enter the slots or safety means 84 of the opening 82 and are positively held against lateral or releasing movement. In this way, the locking portions 32 of the fastener are positively held in retaining engagement with the recesses 30 of the locking lug 26.

The straps 2 and 4 are secured together in a manner which will retain the straps in connected relation even when they are subjected to extreme tension such as the force encountered during shock loading of a parachute canopy or during a parachute descent.

When it is desired to disconnect the straps 2 and 4 so that the harness may be released from the wearer, the cable 62 is pulled by movement of a two position operating device (not shown). During initial movement of the actuating cable 62 the actuating member or slide 76 is moved to the right as seen in Fig. 3 against the action of the springs 78 so that the slack in the actuating cable 62 may be taken up and the slide 76 moved into position to disengage the safety means from the operating pins 66 and allow lateral movement of the pins and latching elements 34 for releasing the locking lug 26. By reason of the slot 80 in the actuating member or slide 76, this initial movement of the actuating member may take place without any movement of the links 70 or latching elements 34. A lost motion connection is thereby provided which allows the slack in the cable 62 to be taken up without danger of unintentional or accidental release of the straps. The initial movement of the actuating cable to ready the fastener for releasing movement will normally occur during the first of two distinct movements of the operating device.

Thereafter, when the operating device is given a second or releasing movement the actuating cable 62 is further pulled to draw the actuating member or slide 76 further to the right whereby the pin 72 to which links 70 are connected is moved to the right as seen in Figs. 2 and 3 forcing the operating pins 66 laterally outward. The latching elements 34 are thereby moved outward against the action of the spring 44 to withdraw the locking portions 32 from the recesses 30 in the locking lug 26. The locking lug and the terminal member 20 on the strap 4 are thus released so that the strap may be pulled easily from the fastener and the straps 2 and 4 are thereby disconnected.

The operation of the fastener illustrated is simple and positive in both its connecting and disconnecting movements. It thus affords the maximum safety under all conditions of use. Furthermore, the construction is small, simple and light in weight and the parts do not have to be accurately machined, and fitted together. Therefore, even though dirt should enter the fastener the device is still capable of easy operation under the most adverse conditions.

The particular form of the present invention shown in the drawings and described above has been found to be most satisfactory. However, the various elements of the combination and the form, construction and arrangement thereof are capable of numerous changes and modifications. In view thereof, it should be understood that the form of the invention shown in the drawings and herein described is intended to be illustrative only and is not intended to limit the scope of the invention.

What I claim is:

1. A device for releasably connecting straps comprising a lug carried by one strap and a fastener carried by another strap and formed to receive said lug, said fastener comprising support means, a pair of spaced latching elements pivotally mounted on said support means and engageable with said lug for releasably securing said lug to said fastener, means urging said latching elements into engagement with said lug when said lug is inserted therebetween, a pair of links pivotally connected to said latching elements and to each other, and an actuating member movable with respect to said links into and out of a locking position, said links and actuating member having cooperating means thereon engageable upon movement of said actuating member into said locking position to prevent movement of said links and latching elements to release said lug and having additional means thereon engageable when the actuating member is moved out of said locking position for moving said links and latching elements to release said lug.

2. A device for releasably connecting straps comprising a lug carried by one strap and a fastener carried by another strap and formed to receive said lug, said fastener including support means, a pair of spaced latching elements pivotally mounted on said support means for movement into and out of engagement with said lug for securing said lug to said fastener, means urging said latching elements into engagement with said lug when said lug is inserted therebetween, a pair of links pivotally connected to said latching elements and to each other by pivot pins, said pivot pins projecting above said links, said fastener further including a slide positioned above said links and movable into and out of a locking position, said slide having means thereon engageable with certain of said pivot pins when the slide is moved into said locking position to hold said links and latching elements in lug retaining positions, said slide further having means thereon engageable with another of said pivot pins on movement out of said locking position to spread the latching elements and release said lug, and means connected to said slide for moving the same.

3. A device for releasably connecting straps comprising a lug carried by one strap and a fastener carried by another strap, the fastener being formed with an opening into which said lug may be inserted, a latching member movably located within said opening and having a pin projecting therefrom, spring means urging the latching member into retaining engagement with said lug, a link connected to said latching member and movable against the action of said spring means to disengage the latching member from said lug, and an actuating member movable into and out of a locking position and having an opening therein into which said pin projects, the wall of said actuating member opening having a portion thereof presenting a side positioned to be engaged by said pin and serving to prevent disengaging movement of the latching member when said actuating member is in said locking position, and another portion positioned to permit such movement of the latching member when said actuating member is out of said locking position, and means for moving said actuating member and latching member against the action of said spring to disengage the latching member from said lug.

4. A device for releasably connecting straps comprising a lug carried by one strap and a fastener carried by another strap, the fastener being formed with an opening into which said lug may be inserted, a latching member movably located within said opening and having a pin projecting therefrom, spring means urging the latching member into retaining engagement with said lug, a link connected to said latching member and movable against the action of said spring means to disengage the latching member from said lug, an actuating member movable into and out of a locking position and having an opening therein into which said pin projects, the wall of said actuating member opening having a portion thereof presenting a side positioned to be engaged by said pin when said actuating member is in said locking position and serving thereby to prevent disengaging movement of the latching member, and another portion positioned to permit such movement of the pin and latching member when said actuating member is out of said locking position, a spring urging the actuating member into said locking position, manually operable means for moving the actuating member against the action of the latter spring and out of said locking position, and means on the actuating member movable therewith for moving said link to cause the latching member to disengage said lug.

5. A device for releasably securing straps together comprising a lug carried by one strap and a fastener carried by another strap, said fastener comprising a base, latching members pivotally connected to said base and movable toward and away from each other into and out of retaining engagement with said lug, said latching members each having a pin thereon, a plate overlying the latching members and formed with openings therein through which said pins project, links overlying the plate and connected to said pins and to a common pivotal element movable to actuate said latching members, an actuating member formed with openings therein into which said pins extend, the walls of said openings having portions positioned to be engaged by said pins and hold the latching members against lug releasing movement, and means for moving said actuating member to disengage said pins from said portions of the openings in the actuating member and to move said links to release said latching members from said lug.

References Cited in the file of this patent

UNITED STATES PATENTS

| 1,213,332 | Calthrop | Jan. 23, 1917 |
| 1,394,793 | Rutten | Oct. 25, 1921 |

FOREIGN PATENTS

| 113,796 | Australia | Sept. 18, 1941 |
| 367,526 | Germany | Jan. 23, 1923 |